United States Patent
Fischer et al.

(10) Patent No.: US 7,903,381 B2
(45) Date of Patent: Mar. 8, 2011

(54) NEGATIVE SEQUENCE DIFFERENTIAL ELEMENT

(75) Inventors: Normann Fischer, Colfax, WA (US); Casper A. Labuschagne, Pullman, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 0 days.

(21) Appl. No.: 12/046,250

(22) Filed: Mar. 11, 2008

(65) Prior Publication Data

US 2009/0231769 A1    Sep. 17, 2009

(51) Int. Cl.
*H02H 3/00* (2006.01)
(52) U.S. Cl. .......................................... 361/87
(58) Field of Classification Search ................... 361/87, 361/36; 702/106; 324/424
See application file for complete search history.

(56) References Cited

U.S. PATENT DOCUMENTS

| | | |
|---|---|---|
| 4,204,237 A | 5/1980 | Zocholl |
| 4,402,028 A | 8/1983 | Udren |
| 4,758,774 A | 7/1988 | Crawford |
| 4,825,326 A | 4/1989 | Andow |
| 4,841,405 A | 6/1989 | Udren |
| 5,014,153 A | 5/1991 | Wilkerson |
| 5,115,226 A | 5/1992 | Schweitzer |
| 5,276,402 A | 1/1994 | Schucht |
| 5,309,312 A | 5/1994 | Wilkerson |
| 5,602,707 A | 2/1997 | Schweitzer |
| 5,703,745 A | 12/1997 | Roberts |
| 5,784,233 A | 7/1998 | Bastard |
| 5,790,357 A * | 8/1998 | Schiel .......................... 361/36 |
| 5,796,258 A | 8/1998 | Yang |
| 5,963,404 A | 10/1999 | Guzman-Casillas |

(Continued)

FOREIGN PATENT DOCUMENTS

WO    WO 2005/064759    7/2005

(Continued)

OTHER PUBLICATIONS

Xiangning Lin, Qing Tian, Pei Liu, The Self-Adaptation Compensated Differential Protection of Powerformer, The Department of Electrical Engineering, Huazhong University of Science and Technology (HUST), Wuhan 430074, China.

(Continued)

*Primary Examiner* — Stephen W Jackson
*Assistant Examiner* — Angela Brooks
(74) *Attorney, Agent, or Firm* — Stoel Rives, LLP

(57) ABSTRACT

A negative sequence differential element may detect a fault in an electrical power system by computing a differential between negative sequence values derived from a first phase-current measurement and a second phase-current measurement. A transformer may be disposed between the first phase-current and second phase-current measurement location. The first phase-current measurement and the second phase-current measurement may be normalized and a negative sequence current may be calculated therefrom. The negative sequence currents may be used to calculate an operating quantity, which may be an absolute value of the sum of the first and second negative sequence currents, and a restraint quantity comprising a maximum of the first and second negative sequence currents. The restraint quantity may be scaled by a slope factor. A fault may be detected if the operating quantity exceeds the scaled restraint quantity and a pickup current threshold.

25 Claims, 5 Drawing Sheets

U.S. PATENT DOCUMENTS

| | | | |
|---|---|---|---|
| 6,011,480 | A | 1/2000 | Schweitzer |
| 6,148,267 | A | 11/2000 | Premerlani |
| 6,256,592 | B1 | 7/2001 | Roberts |
| 6,341,055 | B1 | 1/2002 | Guzman-Casillas |
| 6,356,421 | B1 | 3/2002 | Guzman-Casillas |
| 6,411,865 | B1 | 6/2002 | Qin |
| 6,476,521 | B1 | 11/2002 | Lof |
| 6,483,680 | B1 | 11/2002 | Kulidjian |
| 6,507,184 | B1 * | 1/2003 | Elston ................. 324/107 |
| 6,518,767 | B1 | 2/2003 | Roberts |
| 6,590,397 | B2 | 7/2003 | Roberts |
| 6,662,124 | B2 * | 12/2003 | Schweitzer et al. ........... 702/65 |
| 6,670,721 | B2 | 12/2003 | Lof |
| 7,123,459 | B2 | 10/2006 | Schweitzer |
| 7,196,884 | B2 | 3/2007 | Guzman-Casillas |
| 7,319,576 | B2 | 1/2008 | Thompson |
| 2007/0021937 | A1 * | 1/2007 | Labuschagne et al. ...... 702/106 |
| 2007/0035902 | A1 * | 2/2007 | Schweitzer et al. ........... 361/64 |
| 2007/0070565 | A1 | 3/2007 | Benmouyal |
| 2008/0088466 | A1 | 4/2008 | Labuschagne |
| 2008/0130179 | A1 | 6/2008 | Gajic |

FOREIGN PATENT DOCUMENTS

WO     WO2005/064759 A1 *    7/2005

OTHER PUBLICATIONS

Walter A. Elmore, Ways to Assure Improper Operation of Transformer Differential Relays, Consulting Engineer, ABB Power T&D Co., Inc., Coral Spring, Florida, presented to the Forty-Fifth Annual Conference for Protective Relaying Engineering at the Georgia Institute of Technology, Atlanta, Georgia, May 1-3, 1991.

Gerald Dalke, Solutions for Unconventional CT Connections, Basler Electric Company, presented before the 59th Annual Georgia Tech Protective Relaying Conference, Atlanta, Georgia, Apr. 27-29, 2005.

Mike Young, John Horak, Commissioning Numerical Relays, Basler Electric Company.

Zoran Gajic, Igor Ivankovic, Bozidar Filipovic-Grcic, Renata Rubesa, New Method for Differential Protection of Phase Shifting Transformers, Sep. 6, 2006.

Casper Labuschagne, Normann Fischer, Transformer Fault Analysis Using Event Oscillography, Sep. 15, 2006.

Tziouvaras, Demitrios A., Protecting a 138 KV Phase Transformer EMTP Modeling and Model Power System Testing, Nov. 2002.

Yonghong Chen, Xing Liu, Vaithianathan Venkatasubramanian, Fast Algorithms for Detecting Circular VAR Flows in Large Power-Flow Models, Proceedings of the 41st Hawaii International Conference on System Sciences, Jan. 7-10, 2008.

Zoran Gajic, Ivo Brncic, Birger Hillstrom, Fahrudin Mekic, Igor Ivankovic, Sensitive Turn-to-Turn Fault Protection for Power Transformers.

Ivo Brncic, Zoran Gajic, Torbjorn Einarsson, Transformer Differential Protection Improved by Implementation of Negative-Sequence Currents, ABB Power Technologies.

Bill Flemming, Negative Sequences Impedance Directional Element, Feb. 16, 1998.

Fernando Calero, Rebirth of Negative-Sequence Quantities in Protective Relaying with Microprocessor-Based Relays, Oct. 2003.

V. Duraisamy, N. Devarajan, P.S. Vinoth Kumar, S.N. Sivanandam, D. Somasundareswari, A Fuzzy Based Fault Detection Scheme for Synchronous Generator, Mar. 2000.

M.G. Melero, M.F. Cabanas, C. Rojas, F. Pedrayes, G.A. Orcajo, J.M. Cano, Accelerated Ageing Test Applied to the Early Detection of Insulation Failures in Low Voltage Induction Motors, Oct. 2, 2007.

* cited by examiner

NEGATIVE SEQUENCE DIFFERENTIAL ELEMENT

TECHNICAL FIELD

This disclosure relates to systems and methods for the protection of power transformers, autotransformers, or other power system elements from internal faults, such as transformer turn-to-turn fault using a differential element.

BRIEF DESCRIPTION OF THE DRAWINGS

Additional aspects and advantages will be apparent from the following detailed description of preferred embodiments, which proceeds with reference to the accompanying drawings, wherein.

DETAILED DESCRIPTION OF PREFERRED EMBODIMENTS

Figure 1:
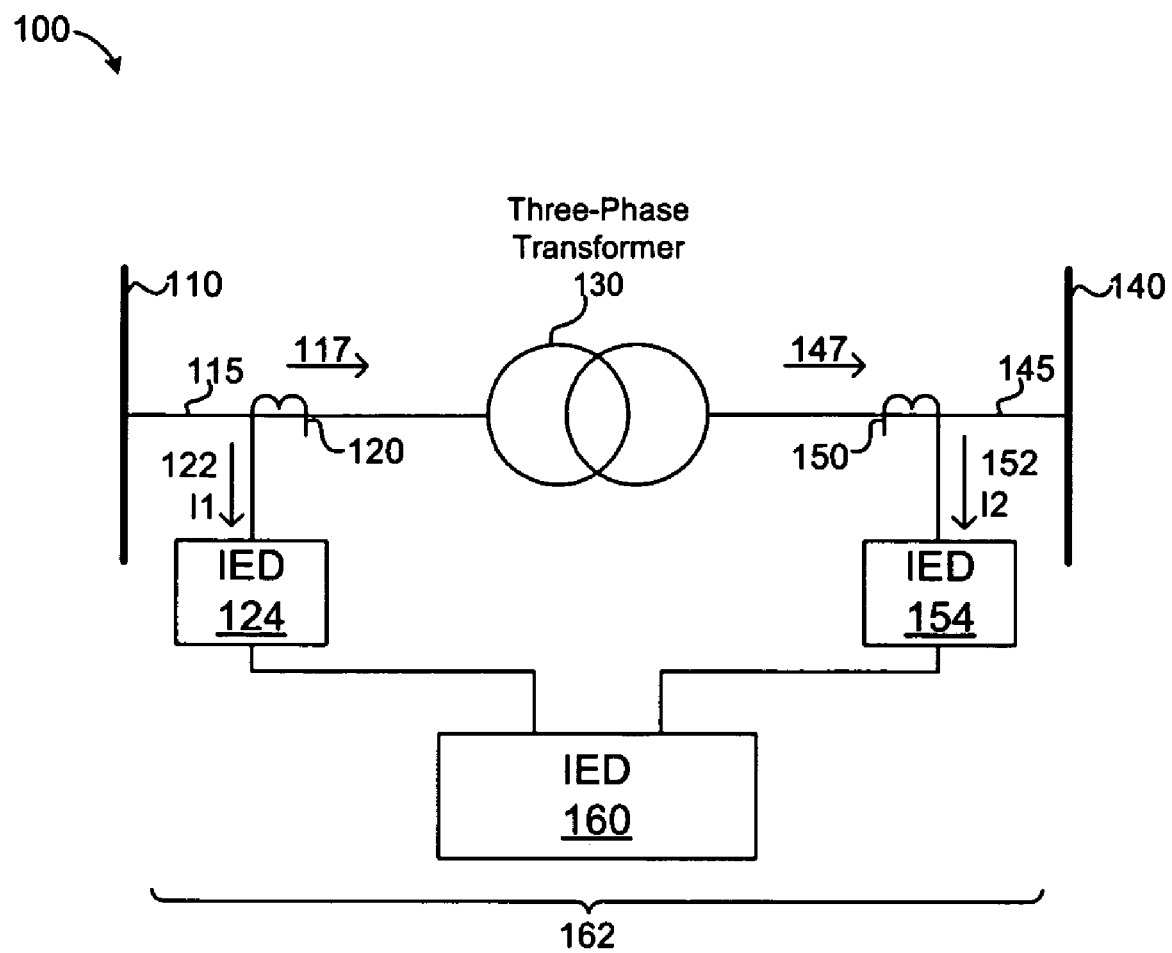
FIG. 1 is a block diagram of one embodiment of a power system network.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, configurable hardware (e.g., a Field Programmable Gate Array (FPGA), Application Specific Integrated Circuit (ASIC) or the like), software, and/or firmware.

Embodiments may also be provided as a computer program product, including a computer-readable medium having stored thereon instructions that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Turning now to FIG. 1, one embodiment of an electrical power system 100 is depicted. Power system 100 may comprise a first node 110 having a first voltage level. Node 110 may comprise a power system bus (e.g., a busbar), power transmission line, or the like. Node 110 may be electrically coupled to a transformer 130 via conductor 115 to allow a current 117 to flow therebetween. Node 110 may have a first voltage level thereon comprising a three-phase voltage signal and, as such, current 117 may comprise a three-phase current signal. Conductor 115 may comprise a plurality of conductors; for example, conductor 115 may comprise one conductor 115 per phase of current 117. The phases of current 117 may be referred to as $I_{117\_A}$, $I_{117\_B}$, and $I_{117\_C}$.

Current transformer 120 may be configured to measure current 117 on conductor 115. If current 117 comprises a three-phase current, current transformer 120 may comprise a plurality of current transformers 120 to measure each phase of current 117 (e.g., a current transformer to measure each of $I_{117\_A}$, $I_{117\_B}$, and $I_{117\_C}$).

Transformer 130 may be a three-phase transformer comprising a plurality of windings. Although FIG. 1 depicts transformer 130 as a two (2)-winding transformer, one skilled in the art would recognize that any transformer comprising any number of windings could be used at 130 under the teachings of this disclosure.

An electro-motive force created by current 117 at the first voltage level of node 110 may cause transformer 130 to produce a current 147 on conductor 145, which, in turn, may create a second voltage level on second node 140.

Current transformer 150 may be configured to measure current $I_{147}$ on conductor 145. Current 145 may comprise a three-phase current and, as such, current transformer 150 may comprise a plurality of current transformers 150 to measure each phase of current 147 (e.g., a current transformer to measure each of $I_{147\_A}$, $I_{147\_B}$, and $I_{147\_C}$).

Current transformer 120 may be communicatively coupled to an intelligent electronic device (IED) 124. As used herein, an IED may refer to any one or combination of a central processing unit (CPU)-based relay and/or protective relay, communication processor, digital fault recorder, phase measurement unit (PMU), phase measurement and control unit (PMCU), phasor data concentrator (PDC), wide area control system (WACS), wide area protection system (WAPS), a Supervisory Control and Data Acquisition (SCADA) systems, or the like.

IED 124 may be configured to obtain current measurements from conductor 115 using current transformer 120 and to transmit the phase-current measurements to IED 160. In an alternative embodiment, IED 160 may be directly communicatively coupled to current transformer 120 to obtain phase-current measurements therefrom. In this alternative embodiment, IED 124 may be omitted.

Current transformer 150 may be communicatively coupled to IED 154. IED 154 may be configured to obtain current measurements from conductor 145 using current transformer 150 and to transmit the phase-current measurements to IED 160. In an alternative embodiment, IED 160 may be directly communicatively coupled to current transformer 150 to obtain phase-current measurements therefrom. In this alternative embodiment, IED 154 may be omitted.

IED 160 may comprise a differential element configured to monitor and/or protect power system segment 162. As such, segment 162 may be referred to as the "protected region" and/or "internal" to region 162 of power system 100. Portions of the power system outside of protected region 162 may be referred to as "external." As such, a power system fault, may be either internal to region 162 (i.e., an internal fault) or external to region 162 (i.e., an external fault).

One example of an internal fault is a fault occurring in transformer 130, such as a transformer 130 turn-to-turn fault. This type of fault may create a heavy fault current in the short-circuited transformer turns, but small corresponding current change at the transformer terminals. This may prevent traditional fault detection systems from detecting the fault before it develops into a more serious fault (such as a ground fault) that may damage the transformer 130. Transformers do not typically produce negative-sequence current. Therefore, by differentiating between the negative-sequence current into and out from the protected region 162, the negative sequence differential element described herein may quickly detect internal faults, such as a turn-to-turn fault in transformer 130, and the detection may then be used to prevent damage and disruption to power system 100 and segment 162.

IED 160 may receive phase-current measurements from one or more current and/or voltage transformers disposed within internal region 162. Although FIG. 1 depicts IED 160 communicatively coupled to two (2) current transformers 120 and 150, one skilled in the art would recognize that IED 160 could be communicatively coupled to an unlimited number of current transformers, voltage transformers, or the like depending upon the configuration of power system network 100.

IED 160 may receive three-phase-current measurements from current transformers 120 and 150 and may perform one or more monitoring and/or protective functions therewith. As part of one or more monitoring and/or protection functions, IED 160 may employ a negative sequence differential element. As will be described below, a negative sequence differential element may be used to detect an internal fault (e.g., a turn-to-turn fault in transformer 130) and, responsive to detecting such a fault, may invoke one or more protective functions. For example, upon detecting an internal fault, such as a turn-to-turn transformer 130 fault, IED 160 may isolate power system segment 162 and, in particular, transformer 130, from the rest of the power system 100. This may reduce and/or prevent serious damage to the power system segment components and, in particular, to transformer 130.

Figure 2:
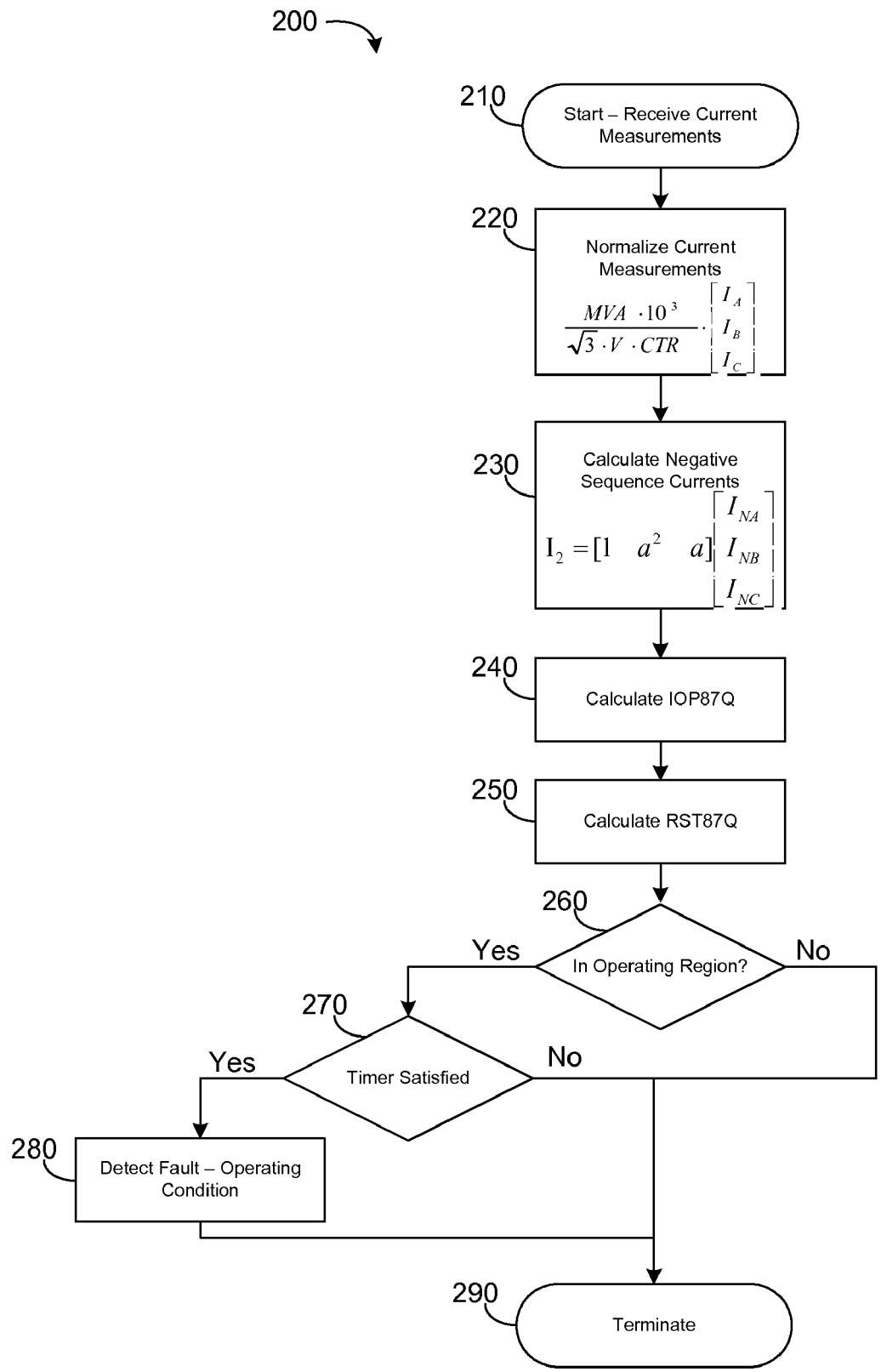
FIG. 2 is a flow diagram of one embodiment of a method for detecting a fault in a power system network using a negative-sequence differential element.

Turning now to FIG. 2, a flow diagram of one embodiment of a method 200 for providing a negative sequence differential element is depicted.

At step 210, one or more phase-current measurements may be received. The phase-current measurements received at step 210 may comprise time stamp information to allow method 200 to time align the measurements. As such, referring back to FIG. 1, IEDs 124, 154, and/or 160 may be communicatively coupled to a common time source, including, but not limited to: a Global Positioning System (GPS); a radio time source, such as the short-wave WWV transmitter operated by the National Institute of Standards and Technology (NIST) at 2.5 MHz, 5 MHz, 10 MHz, 15 MHz and 20 MHz or a low frequency transmitter, such as WWVB operated by NIST at 60 Hz; a cesium clock; an atomic clock; and the like. Accordingly, IEDs 124, 154, and/or 160 may be configured to include time stamp data with phase-current measurement data.

The inclusion and/or reference to common time source data may allow an IED to time align the current measurements received from current transformers 120 and 150. This time alignment may be done using any phasor measurement and/or time stamping technique and/or methodology known in the art. For example, the techniques and methods of: U.S. Pat. No. 6,662,124 entitled, "Protective Relay with Synchronized Phasor Measurement Capability for Use in Electric Power Systems," to Schweitzer, III et al.; U.S. Pat. No. 6,845,333 entitled, "Protective Relay with Synchronized Phasor Measurement Capability for Use in Electric Power Systems," to Anderson et al.; and/or U.S. Application Pub. No. 2007/0086134 entitled, "Apparatus and Method for Estimating Synchronized Phasors at Predetermined Times Referenced to an Absolute Time Standard in an Electrical System" to Zweigle et al., each of which is hereby incorporated by reference in its entirety, could be used under the teachings of this disclosure. Additionally, the phase-current measurements received at step 210 may comprise synchrophasors.

Referring back to FIG. 2, after receiving and/or time aligning the current measurements, the flow may continue to step 220 where the phase-current measurements may be normalized. Step 220 may be used where the measured currents differ due to the current transformer used to measure the current, the voltage level associated with the current measurements, a configuration of a transformer (not shown) disposed between the current measurements, and/or other power system network elements. For example, a current transformer used to measure one or more current phases may have an input to output current ratio R. As such, the measured current, $I_M$ may be a substantially linearly scaled equivalent of the input current $I_I$, as shown below in Equation 1.1:

$$R = \frac{I_M}{I_I}, I_M = RI_I \qquad \text{Eq. 1.1}$$

In some embodiments, where the input current may be large, R may be less than one (1) to reduce the measured secondary current $I_M$. As such, in order to normalize the current measurements of step 210, the measurements step 210 may be scaled by their corresponding current transformer ratios.

Other power system elements may introduce normalization error. For example, a transformer may be disposed between a first and a second current measurement (e.g., transformer 130 in FIG. 1). The transformer may change a phase, magnitude, or the like, of an input signal. As such, in order to normalize the current measurements received at step 210, the measurements may be scaled by the transformer volt-ampere (VA) rating.

For the power system network topology depicted in FIG. 1, a normalization factor for current 122 measured by CT 120 is given as Equation 1.2 below:

$$TAP_{122} = \frac{MVA_{130} \cdot 10^3}{\sqrt{3} \cdot V_{110} \cdot R_{120}} \qquad \text{Eq. 1.2}$$

Referring to FIG. 1, in Equation 1.2, $TAP_{122}$ may represent a normalization factor for the "source" current measurement 122 obtained by current transformer 120. Accordingly, $MVA_{130}$ may be the mega volt-ampere (MVA) rating of transformer 130, $V_{110}$ may be the voltage level of node 110, and $R_{120}$ may be the current transformer ratio of CT 120. As such, a normalized current 122 ($I_{N\_122}$) may be calculated per Equation 1.3:

$$I_{N\_122} = TAP_{122} \cdot I_{122} \qquad \text{Eq. 1.3}$$

A normalization factor $TAP_{152}$ for current 152 measured by current transformer 150 is given as Equation 1.4:

$$TAP_{152} = \frac{MVA_{130} \cdot 10^3}{\sqrt{3} \cdot V_{140} \cdot R_{150}} \qquad \text{Eq. 1.4}$$

In Equation 1.4, $V_{140}$ may represent the voltage level of second node 140 and $R_{150}$ may be the ratio of current transformer 150. As such, a normalized current 152 ($I_{N\_152}$) may be calculated per Equation 1.5:

$$I_{N\_152} = TAP_{152} \cdot I_{152} \qquad \text{Eq. 1.5}$$

The normalization factors of Equation 1.2 and 1.4 may be applied to each phase of the current measurements 122 and 152 per Equations 1.6 and 1.7:

$$\begin{bmatrix} I_{NA\_122} \\ I_{NB\_122} \\ I_{NC\_122} \end{bmatrix} = TAP_{122} \begin{bmatrix} I_{A\_122} \\ I_{B\_122} \\ I_{C\_122} \end{bmatrix} \qquad \text{Eq. 1.6}$$

$$\begin{bmatrix} I_{NA\_152} \\ I_{NB\_152} \\ I_{NC\_152} \end{bmatrix} = TAP_{152} \begin{bmatrix} I_{A\_152} \\ I_{B\_152} \\ I_{C\_152} \end{bmatrix} \qquad \text{Eq. 1.7}$$

In Equation 1.6, $I_{NA\_122}$, $I_{NB\_122}$, and $I_{NC\_122}$ may represent normalized phase-current measurements corresponding to current measurement 122, and in Equation 1.7, $I_{NA\_152}$, $I_{NB\_152}$, and $I_{NC\_152}$ may represent normalized current measurements corresponding to current measurement 152.

Although Equations 1.2-1.7 correspond to the network topology depicted in FIG. 1 (e.g., current measurements 122, 152 obtained on either side of a transformer 130), one skilled in the art would recognize that other network topologies could be used under the teachings of this disclosure. Different topologies may require modifying the normalization factors described in Equations 1.2 and 1.4 to account for any additional and/or changed power system elements. For example, where transformer 130 is a phase angle regulating (PAR) transformer, normalization factors 1.2 and 1.4 may comprise a phase shift correction factor. Such correction is described in U.S. Pat. No. 7,319,576 filed Aug. 18, 2005, to Michael J. Thompson, entitled "Apparatus and Method for Providing Differential Protection for a Phase Angle Regulating Transformer in a Power System," which is hereby incorporated by reference in its entirety.

Referring again to FIG. 2, after normalizing the current measurements at step 220, negative sequence symmetrical components may be calculated at step 230. A balanced three-phase signal, such as the current signals received at step 210 and normalized at step 220, may comprise three sinusoidal signals having substantially equivalent magnitudes and a phase offset of substantially 120° per phase. An imbalanced three-phase signal may diverge from a balanced system in that the magnitudes of various phase components may diverge and/or the phase offsets therebetween may diverge from 120°.

A three-phase signal (e.g., a signal comprising phases A, B, and C) may be described in terms of its symmetrical components; a set of phasors in phase with A, B, and C (the zero sequence), a set of phasors having a positive phase sequence relative to the signal (the positive sequence, ABC), and a set of phasors having a negative phase sequence relative to the signal (the negative sequence, ACB).

These symmetrical components may be calculated by applying an alpha (i.e., a) transform to the three-phase signal. For example, the symmetrical components of a three-phase current signal having a positive rotation may be calculated per Equation 1.8:

$$\begin{bmatrix} I_0 \\ I_1 \\ I_2 \end{bmatrix} = \begin{bmatrix} 1 & 1 & 1 \\ 1 & \alpha^2 & \alpha \\ 1 & \alpha & \alpha^2 \end{bmatrix} \begin{bmatrix} I_A \\ I_B \\ I_C \end{bmatrix} \qquad \text{Eq. 1.8}$$

In Equation 1.8, $I_0$ may represent the zero sequence, $I_1$ may represent the positive sequence, $I_2$ may represent the negative sequence of three-phase current ($I_A$, $I_B$, and $I_C$), and a may be the phase rotation operator $e^{j120°}$. The negative sequence differential element of method 200 may only require the negative sequence component of the phase-current and, as such, Equation 1.8 may be simplified to only calculate $I_2$ (the negative sequence component of Equation 1.8). Referring back to FIG. 1, the negative sequence components of phase-currents 122 and 152 may be calculated per Equations 1.9 and 1.10:

$$I_{2\_122} = \begin{bmatrix} 1 & k_1 & k_2 \end{bmatrix} \begin{bmatrix} I_{NA\_122} \\ I_{NB\_122} \\ I_{NC\_122} \end{bmatrix} \qquad \text{Eq. 1.9}$$

$$I_{2\_152} = \begin{bmatrix} 1 & k_1 & k_2 \end{bmatrix} \begin{bmatrix} I_{NA\_152} \\ I_{NB\_125} \\ I_{NC\_125} \end{bmatrix} \qquad \text{Eq. 1.10}$$

In Equations 1.9 and 1.10, $k_1$ may be $a^2$ and $k_2$ may be a for a positive phase rotation of $I_{122}$ and/or $I_{152}$ (e.g., ABC), and $k_1$ may be a and $k_2$ may be $a^2$ when the phase rotation of $I_{122}$ and/or $I_{152}$ is negative (e.g., ACB).

At steps 240-260, the normalized negative sequence current measurements may be used to detect an internal fault (e.g., a fault occurring between the first current measurement and the second current measurement). This may be done by defining an operating region of the differential element. In this embodiment, an internal fault may be detected if the system is in an "operating region" and a nominal (i.e., no-fault) condition may be detected if the system is in a "restraint region." A graphical depiction of an operating region and restraint region is provided below in FIG. 3. Determining whether the current measurements fall within the operating or restraint region is determined by method 200 step 260.

At step 240, a magnitude of the sum of the negative sequence components (referred to as operating quantity "IOP87A") may be calculated per Equation 1.11:

$$IOP87Q = |I_{2\_122} + I_{2\_152}| \quad \text{Eq. 1.11}$$

Operating quantity IOP87Q may be used to define the operating region of the negative differential element of method 200.

At step 250, a maximum value of the negative sequence components (hereafter referred to as restraint quantity "RST87Q") may be calculated per Equation 1.12:

$$RST87Q = \max\{|I_{2\_122}|, |I_{2\_152}|\} \quad \text{Eq. 1.12}$$

Restraint quantity RST87Q may be scaled by a slope factor (SLPQ1) to define a restraint region of the negative differential element of method 200.

Figure 3:
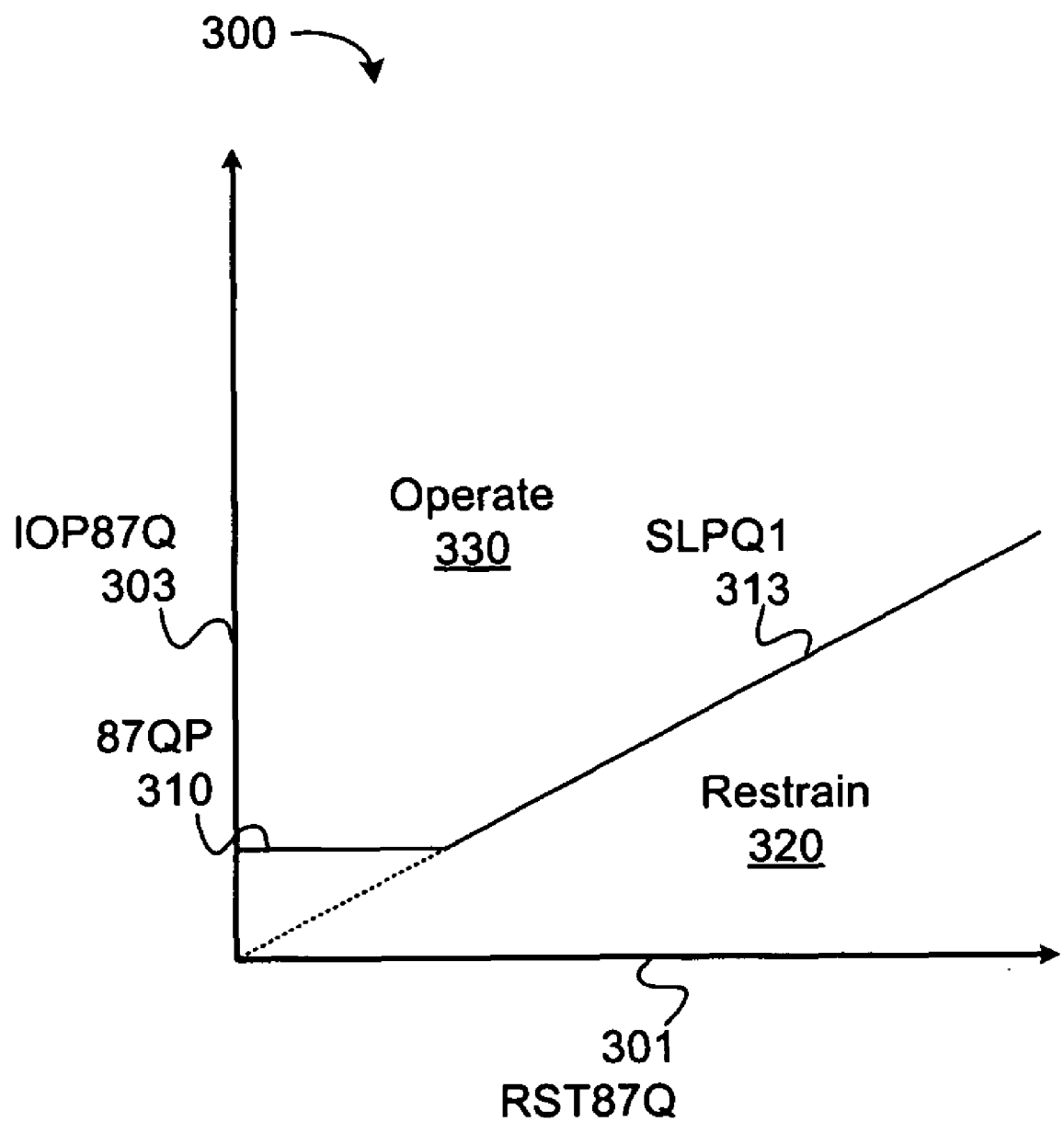
FIG. 3 is a depiction of an operating region and a restraint region of a differential element.

Turning to FIG. 3, a graphical depiction of one embodiment of an operating and restraint region of a negative sequence differential element is depicted. Plot 300 may comprise a restraint quantity RST87Q axis 301 and operating quantity IOP87Q axis 303. Pickup current threshold value 87QP 310 and slope value SLPQ1 313 may define restraint region 320 and operating region 330. As such, differential element may be in operating region 330 if the IOP87Q quantity is greater than the pickup current threshold 87QP 310 and the product of restraint quantity RST87Q scaled and slope value SLPQ1 313. Differential element may be restraint region 320 otherwise (i.e., IOP87Q is less than RST87Q scaled by SLPQ1 313 or pickup constant 87QP 310).

Referring again to FIG. 2, at step 260 an operating region may be determined. As discussed above, a fault may be detected if operating quantity IOP87Q is greater than a pickup current constant (87QP) and the product of the restraint quantity RST87Q scaled by slope constant (SLPQ1). One embodiment of a formula for detecting a fault (referred to in Equation 1.13 as operating condition "Op") is provided in Equation 1.13:

$$Op = IOP87Q > \max\{87QP, (RST87Q \cdot SLPQ1)\} \quad \text{Eq. 1.13}$$

In Equation 1.13, an operating condition "Op" (i.e., internal fault) may be detected if operating quantity IOP87Q is greater than the maximum of pickup current constant 87QP and the scaled restraint quantity RST87Q scaled by scale factor SLPQ1.

The operating condition may be indicative of an internal fault and, as such, may trigger a protective function of an IED. In some cases, however, the detection of Op at Equation 1.13 may be caused by a condition other than an internal fault. For example, circuit energization, an external fault, an open circuit current transformer causing, for example, phase-current measurement error, power system transients, and/or glitching may cause negative sequence current to flow through the system, which may, in turn, cause Op of Equation 1.13 to be asserted. As such, method 200 may comprise logic to nullify Op via one or more external inputs corresponding to the aforementioned condition(s). Accordingly, Equation 1.13 may comprise additional AND and/or NAND input logic to nullify Op due to an external input, such as an energization condition input, an external fault input, an open circuit current transformer condition input, or the like. Examples of such external inputs are described below in conjunction with FIG. 5. If Op is asserted at step 260, the flow may continue to step 270; otherwise, the flow may terminate at step 290.

At step 270, method 200 may determine whether Op of Equation 1.13 has been asserted for a threshold period of time (i.e., whether the system has been maintained within the operating region 330 of FIG. 3 for a threshold period of time). This threshold may be referred to as the 87QD threshold, and may be used to prevent false fault detection due to transient conditions and/or glitching in the power system network (not shown). If the threshold of step 270 is satisfied, the flow may continue to step 280; otherwise, the flow may terminate at step 290.

At step 280, method 200 may detect a power system fault (e.g., an internal fault, such as a turn-to-turn fault in a transformer). The detection of step 280 may comprise setting one or more alarms for transmission to and/or display on a human machine interface communicatively coupled to an IED. Where the device performing method 200 comprises one or more protective functions, the detection at step 280 may comprise invoking one or more of these protective functions (e.g., isolating the power system segment from the rest of the power system, shedding one or more loads, or the like). The flow may then terminate at step 290.

Figure 4:
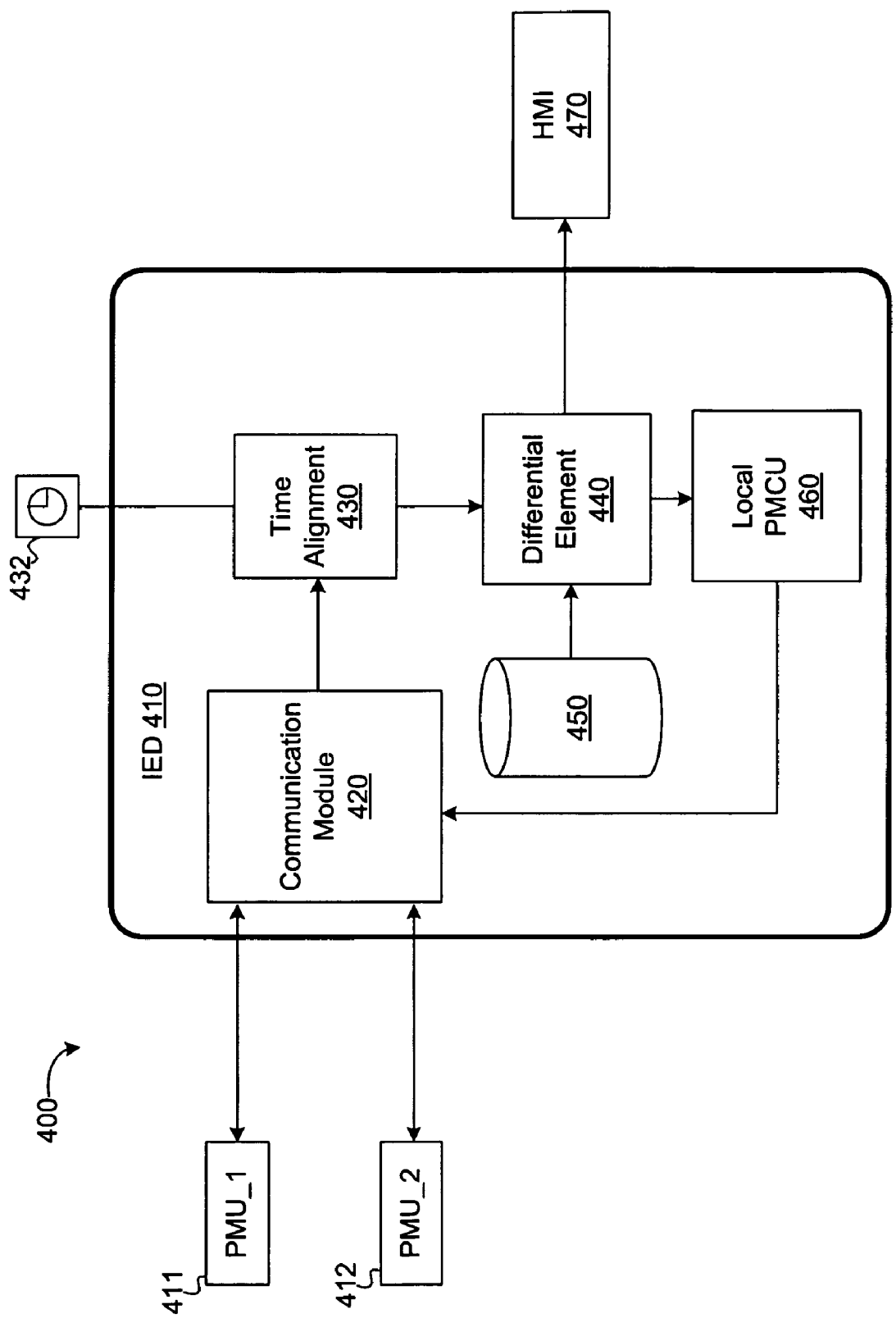
FIG. 4 is a block diagram of one embodiment of an intelligent electronic device (IED) comprising a differential element.

Turning now to FIG. 4, a block diagram of one embodiment of a system 400 comprising a negative differential element is depicted.

System 400 may comprise an IED 410 in communication with phasor measurement units (PMU) 411 and 412. Phasor measurement unit PMU_1 411 may be communicatively coupled to a first power system segment (not shown) to measure a current flowing between a first power system node (not shown) and a transformer (not shown). Second PMU_2 412 may be communicatively coupled to a second segment of the power system (not shown) to measurement a current flowing between the transformer (not shown) and a second node (not shown).

Communication module 420 may be communicatively coupled to PMU_1 411 and PMU_2 412 to receive phase-current measurements therefrom. In an alternative embodiment, IED 410 may be directly coupled to first power system segment (not shown) and/or second power system segment (not shown) via a first and second current transformer (not shown). In this embodiment, IED 410 may be configured to obtain phase-current measurements directly from the first and second power system segments (not shown).

Communication module 420 may be configured to communicate with PMU_1 411 and PMU_2 412 using the IEEE C37.118 communication standard (hereafter "118 standard"). The 118 standard may be used to communicate synchronized phasor measurement data. The 118 standard is not media dependent and, as such, may be used on EIA-232 and/or an Ethernet communications connection. Accordingly, PMU_1 411 and PMU_2 412 may be referred to as "118 clients" and IED 410 may be referred to as a "118 server." One skilled in the art, however, would recognize that PMU_1 411, PMU_2 412, and IED 410 could be configured to use any communications standard and/or protocol known in the art such as, for example, SEL Fast Message, Mirrored-Bits® communication, GOOSE, IEC 61850, MODBUS, and the like. As such, this disclosure should not be read as limited to any particular communications standard and/or protocol.

The measurements received by communication module 420 from PMU_1 411 and PMU_2 412 may flow to time alignment module 430. As discussed above, the phase-current measurement data received from PMU_1 411 and PMU_2

412 may comprise time stamp or other measurement timing information according to the 118 standard, or some other time alignment technique. As such, time alignment module 430 may time align the measurement data relative to one another and/or to a common time reference. In one embodiment, time alignment module 430 may align incoming messages to a common time reference 432. Common time reference 432 may be common to IED 410, PMU_1 411, and PMU_2 412. As discussed above, common time reference 432 may be provided by various time sources including, but not limited to: a Global Positioning System (GPS); a radio time source, such as the short-wave WWV transmitter operated by the National Institute of Standards and Technology (NIST) at 2.5 MHz, 5 MHz, 10 MHz, 15 MHz and 20 MHz or a low frequency transmitter, such as WWVB operated by NIST at 60 Hz; a cesium clock; an atomic clock; and the like. One skilled in the art would recognize that common time reference 432 could be provided by any time reference known in the art. As such, this disclosure should not be read as limited to any particular time reference 432 implementation.

Time alignment module 430 may modify the magnitude and/or phase of the phase-current measurements received from PMU_1 411 and PMU_2 412 to conform to common time reference 432. Alternatively, PMU_1 411 and PMU_2 412 may be configured to modify one or more of a magnitude and/or phase of an incoming phase-current measurement to conform to common time reference 432. In addition, in some embodiments, time alignment 430 may comprise a buffer memory or other buffering means to time align incoming messages from PMU_1 411 and PMU_2 412.

IED 410 may be directly coupled to the first and second power system segment (not shown). In this case, IED 410 may be configured to time align phase-current measurements obtained from one or more current transformers (not shown) using time alignment module 430 and/or common time source 432.

Time alignment module 430 may provide time aligned phase-current measurements to differential element 440. Differential element 440 may use the measurements to detect a power system fault, such as an internal fault (e.g., a fault between the first power system segment (not shown) and a second power system segment (not shown)), such as, for example, a turn-to-turn fault in a transformer (not shown) disposed therebetween.

Differential element 440 may access data storage module 450, which may comprise one or more user-defined and/or automatically determined threshold and constant values for use by differential element 440. Data storage module 450 may comprise logic and/or machine readable instructions to be executed by differential element 440 and/or may comprise constant and threshold data, such as slope constant SLPQ1, pickup current content 87QP, and the like.

Differential element 440 may be communicatively coupled to a local PMCU 460. As such, differential element 440 may alert PMCU 460 of a fault detected in the power system (not shown). This may be done by, for example, asserting an input of local PMCU 460. Responsive to detecting a fault, local PMCU 460 may be configured to invoke one or more protective functions of IED 410, PMU_1 411, and/or PMU_2 412. For example, in one embodiment PMU_1 411 and/or PMU_2 412 may be phasor measurement control units (PMCU). In this embodiment, local PMCU 460 may direct PMCU 411 and/or 412 to disconnect from the power system and/or invoke some other protective function responsive to a fault. Alternatively, IED 410 and/or local PMCU 460 may be configured to invoke one or more protective functions including, but not limited to: tripping one or more circuit breakers, changing the configuration of one or more switches, removing and/or adding one or more loads, or the like.

Differential element 440 may be communicatively coupled to human machine interface (HMI) 470. Differential element 440 may provide information to allow HMI 470 to display the operating status of the electrical power system (e.g., the operating or restraint status of differential element 440, or the like). This information may comprise indicating whether a fault has been detected and/or other status information relating to differential element 440 (e.g., threshold data or the like). HMI 470 may display fault detection and other data to a human user and/or may allow a user to enter and/or update constant and/or threshold information.

Figure 5:
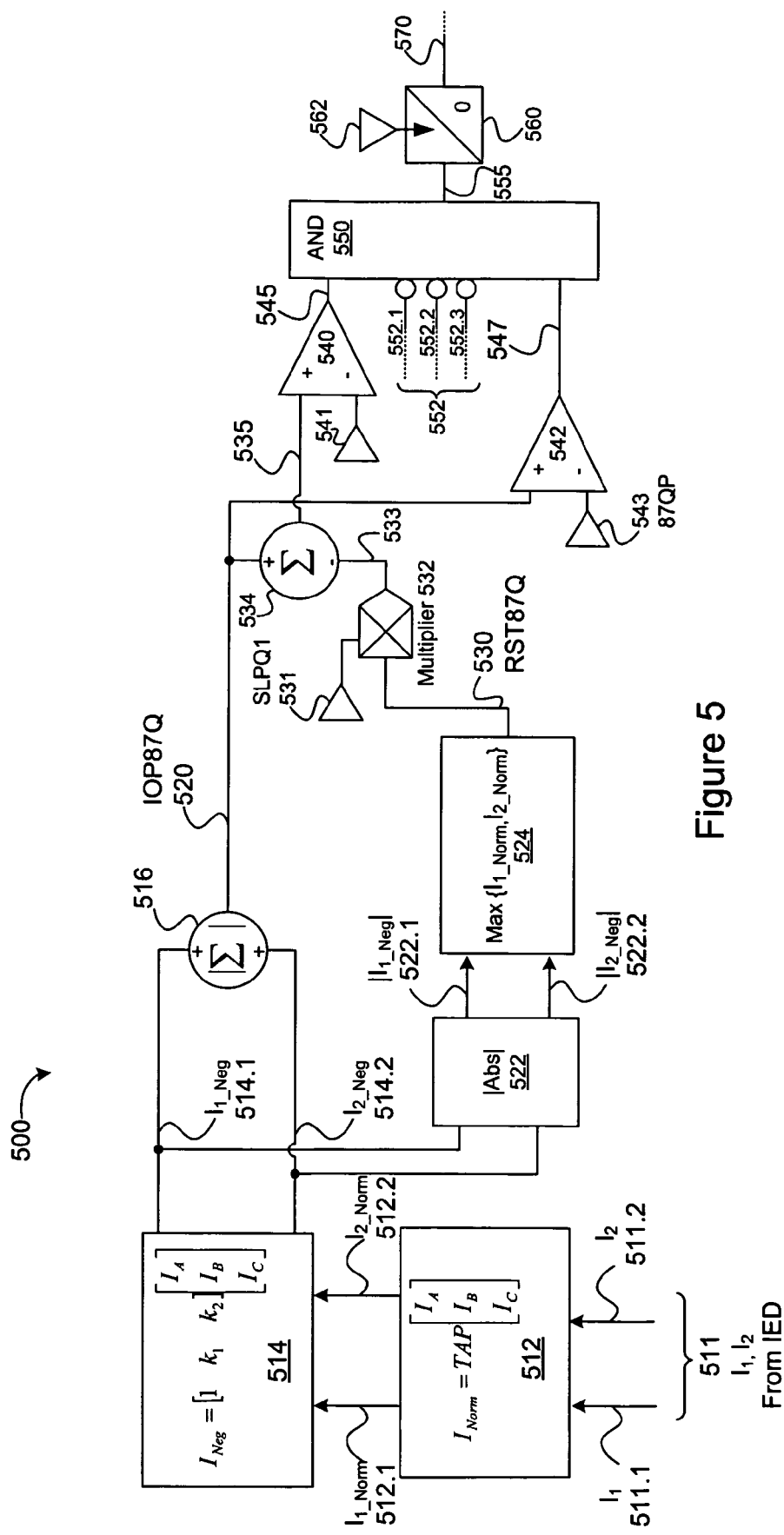
FIG. 5 is a block diagram of one embodiment of a differential element.

Turning now to FIG. 5, a block diagram of one embodiment of a differential element 500 is depicted. Differential element 500 may receive phase-current measurements 511 comprising a first phase-current measurement 511.1 obtained at a first power system segment (not shown) and a second phase-current measurement 511.2 power system segment (not shown). As depicted in FIG. 1, a transformer (not shown) may connect the first power system segment (not shown) to the second power system segment (not shown).

At normalization block 512, phase-current measurements 511.1 and 511.2 may be normalized using a normalization factor. The normalization factor may be based upon a VA rating of the transformer (not shown), a voltage level of the first and/or second power system segment (not shown), and/or a current ratio of the current transformers (not shown) used to obtain current measurements 511.1 and 511.2. In one embodiment, normalization factors similar to those described above in conjunction with FIG. 2 and Equations 1.2 and 1.3 may be used at block 512 to normalize phase-current measurements 511.1 and 511.2.

The normalized phase-current measurements 512.1 and 512.2 may flow to symmetrical component block 514, which may calculate a negative sequence current 514.1 and 514.2 corresponding to the normalized first phase-current measurement 512.1 and second phase-current measurement 512.2, respectively. The negative sequence currents 514.1 and 514.2 may be calculated substantially as described above in conjunction with FIG. 2 and Equations 1.9 and 1.10.

Negative sequence currents 514.1 and 514.2 may flow to adder 516, which may calculate an absolute value of a sum 520 of the first negative sequence current 514.1 and the second negative sequence current 514.2. The output of adder 516 may be referred to as operating quantity IO87Q 520.

Negative sequence currents 514.1 and 514.2 may flow to absolute value block 522, which may calculate an absolute value negative sequence currents 522.1 and 522.2, respectively.

The absolute value negative sequence currents 522.1 and 522.2 may flow to maximum block 524, which may select a maximum value of 522.1 and 522.2. As such, restraint quantity RST87Q 530 may be the greater of 522.1 and 522.2.

Restraint quantity RST87Q 530 may flow to multiplier 532, which may scale restraint quantity RST87Q 530 by a slope constant 531 (SLPQ1). Slope constant SLPQ1 531 may be used to define a restraint region on operating region discussed above in conjunction with FIG. 3 (i.e., SLPQ1 313 in FIG. 3).

The output 533 of multiplier 532 may flow to the negative input of adder 534. The positive input of adder 534 may comprise IOP87Q 520. The output 535 of adder 534 may flow to comparator 540. Comparator 540 may be configured to assert output 545 if input 535 is greater than constant 541. Constant 541 may represent a threshold constant. As such, output 545 of comparator may only assert if output 535 of adder 543 exceeds threshold constant 541 (e.g., 0.01). Output 545 may form an input to AND gate 550.

Operating quantity IOP87Q 520 and constant 543 may flow to comparator 542. Constant 543 may be a pickup current threshold constant (e.g., 87QP 310 of FIG. 3). Output 547 of comparator 542 may assert only if operating quantity IOP87Q 520 is greater than the pickup current constant 87QP 543. Output 547 of comparator 542 may form an input to AND 550.

AND 550 may further comprise external inputs 552. External input 552 may represent conditions that may nullify fault detection (i.e., nullify a condition where differential element 500 may otherwise detect a fault). In one embodiment, external inputs 552 may comprise an energization input 552.1. Energization input 552.1 may assert during power system energization (e.g., transformer energization or the like). Input 552.1 may be inverted such that when energization input 552.1 is asserted, AND gate output 555 may not be asserted. Energization input 552.1 may assert while the transformer (not shown) is energized with current from the first power system segment (not shown) or second power system segment (not shown).

External inputs 552 may comprise an external fault input 552.2. External fault input 552.2 may assert upon detection of a fault outside of the power system segment (e.g., outside of region 162 of FIG. 1). An external fault may cause differential element 500 to erroneously detect an internal fault. As such, external fault input 552.2 may be inverted such that if an external fault condition exists, AND gate output 555 may not be asserted.

External inputs 552 may comprise an open circuit current transformer input 552.3. Open circuit current transformer input 552.3 may be inverted to deassert output 555 of AND gate 550 when asserted. Open circuit current transformer input 552.3 may prevent detection of a fault due to phase-current measurement error in one or more current transformers (not shown) providing phase-current measurements 511.1 and 511.2. Although external inputs 552 are described as comprising inputs 552.1, 552.2, and 552.3, one skilled in the art would recognize that any number of external inputs 552 could be used under the teachings of this disclosure. As such, this disclosure should not be read as limited to any particular external inputs 552.

Output 555 of AND 550 may be asserted when external inputs 552 are deasserted and inputs 545 and 547 are asserted. In other words, the sum of the first and second normalized negative sequence currents 514.1, 514.2 exceeds a scaled maximum 533 of the first and second normalized negative sequence currents 514.1 and 514.2, asserting input 545. And the sum of the first and second normalized negative sequence currents 514.1, 514.2 exceeds pickup current threshold 543, asserting input 547.

The output 551 of AND 550 may flow to timer 560. Timer 560 may assert output 570 only if AND output 555 is maintained in an asserted state for a threshold period of time as determined by threshold constant 562. In another embodiment, 560 may comprise a counter and output 570 may not assert until AND output 555 is asserted for a threshold 562 number of cycles and/or measurements 511.1 and 511.2 (e.g., a threshold number of phase-current measurement iterations). Timer 560 may prevent false detection of a fault due to transient conditions and/or glitching. Assertion of output 570 may represent detection of a fault by differential element 500.

It will be obvious to those having skill in the art that many changes may be made to the details of the above-described embodiments without departing from the underlying principles of the invention. The scope of the present invention should, therefore, be determined only by the following claims.

We claim:
1. A method for detecting a fault in a power system comprising a first conductor electrically coupled to a second conductor through a transformer, the method comprising:
 receiving a first phase-current measurement obtained from the first conductor;
 receiving a second phase-current measurement obtained from the second conductor;
 calculating a first negative sequence current of the first phase-current measurement;
 calculating a second negative sequence current of the second phase-current measurement; and detecting a fault in the power system using an operating quantity and a scaled restraint quantity calculated from the first and the second negative sequence currents in a differential element when the operating quantity exceeds the scaled restraint quantity.

2. The method of claim 1, wherein the step of detecting a fault comprises comparing an absolute value of a sum of the first negative sequence current and the second negative sequence current to a scaled maximum of an absolute value of the first and the second negative sequence current.

3. The method of claim 1, wherein the step of detecting a fault comprises:
 calculating an operating quantity comprising an absolute value of the sum of the first negative sequence current and the second negative sequence current;
 calculating a restraint quantity comprising a maximum of an absolute value of the first negative sequence current and the second negative sequence current;
 scaling the restraint quantity by a slope constant; and
 detecting a fault if the operating quantity exceeds the scaled restraint quantity.

4. The method of claim 3, wherein a fault is detected only if the operating quantity exceeds a pickup current threshold.

5. The method of claim 3, wherein a fault is detected only if the operating quantity exceeds the scaled restraint quantity for a threshold number of phase-current measurements.

6. The method of claim 3, wherein a fault is detected only if the operating quantity exceeds the scaled restraint quantity for a threshold time period.

7. The method of claim 1, wherein a fault is detected only if an energization input is deasserted.

8. The method of claim 1, wherein a fault is detected only if an external fault input is deasserted.

9. The method of claim 1, wherein a fault is detected only if a current transformer open circuit is deasserted.

10. The method of claim 1, wherein the first phase-current measurement and the second phase-current measurement are time aligned.

11. The method of claim 1, wherein the first current measurement comprises a synchrophasor.

12. The method of claim 1, further comprising normalizing the first phase-current measurement and the second phase-current measurement before calculating the first negative sequence current or the negative sequence current.

13. The method of claim 1, further comprising:
 normalizing the first phase-current measurement by a first normalization factor; and
 normalizing the second phase-current measurement by a second normalization factor, wherein the first and the second normalization factors comprise a transformer rating, a voltage level of a conductor corresponding to the phase-current measurement, and a current ratio of a current transformer used to obtain the phase-current measurement.

14. The method of claim 1, wherein the step of detecting comprises detecting a turn-to-turn fault in a transformer.

15. An apparatus for detecting a fault in an electrical power system comprising a first node having a first voltage level electrically coupled to a transformer through a first conductor and a second node having a second voltage level electrically coupled to the transformer through a second conductor, the apparatus comprising:
a first current transformer configured to obtain a phase-current measurement on the first conductor; and
a second current transformer configured to obtain a phase-current measurement on the second conductor; and
a negative sequence differential element communicatively coupled to the first current transformer and the second current transformer, the negative sequence element configured to detect a fault between the first node and the second node using a first negative sequence current derived from a first phase-current measurement obtained from the first current transformer and a second negative sequence current derived from a second phase-current measurement obtained from the second current transformer.

16. The apparatus of claim 15, wherein the negative sequence element is configured to calculate an operating quantity comprising a sum of the first negative sequence current and the second negative sequence current, and a restraint quantity comprising a maximum of the first negative sequence current and the second negative sequence current, and wherein the negative sequence element is configured to detect a fault if the operating quantity exceeds the restraint scaled by a slope factor.

17. The apparatus of claim 16, wherein the negative sequence element is configured to detect a fault only if the operating quantity exceeds a pickup current threshold.

18. The apparatus of claim 16, wherein the negative sequence element is configured to detect a fault only if the operating quantity exceeds the scaled restraint quantity for a threshold number of phase-current measurements or a threshold time period.

19. The apparatus of claim 15, wherein the negative sequence element is configured to detect a fault only if an energization input, external fault input, and an open circuit current transformer input are deasserted.

20. The apparatus of claim 15, wherein the negative sequence element is configured to normalize the first phase-current measurement relative to the second phase-current measurement.

21. The apparatus of claim 15, wherein the negative sequence element is configured to normalize the first phase-current measurement using a first normalization factor and to normalize the second phase-current measurement using a second normalization factor, wherein the first normalization factor comprises a volt-ampere rating of the transformer, a voltage level of the first node, and a current ratio of the first current transformer, and wherein the second normalization factor comprises a volt-ampere rating of the transformer, a voltage level of the second node, and a current ratio of the second current transformer.

22. The apparatus of claim 15, wherein the negative sequence element is configured to time align the first phase-current measurement and the second phase-current measurement.

23. The apparatus of claim 15, wherein the second phase-current measurement comprises a synchrophasor.

24. A system for detecting a fault in an electrical power system comprising a first node at first voltage level electrically coupled to a transformer through a first conductor and a second node at a second voltage level electrically coupled to the transformer through a second conductor, the apparatus comprising:
a first intelligent electronic device (IED) to obtain a first phase-current measurement of a three-phase current on the second conductor;
a second IED to obtain a second phase-current measurement of a three-phase current on the second conductor;
a communication module communicatively coupled to the first IED and the second IED to receive the first phase current measurement and the second phase-current measurement therefrom, wherein the communication module comprises a time alignment module to time align the first phase-current measurement and the second phase-current measurement to a common time standard;
a negative sequence element communicatively coupled to the communication module to receive the time aligned first phase-current measurement and the time aligned second phase-current measurement,
wherein the negative sequence element is configured to detect a fault in the electrical power system between the first node and the second node by comparing an operating quantity to a scaled restraint quantity, wherein the operating quantity comprises an absolute value of a sum of a first negative sequence current derived from the first phase-current measurement and a second negative sequence current derived from the second phase-current measurement, wherein the restraint quantity comprises a maximum of an absolute value of the first negative sequence current and the second negative sequence current, and wherein the negative sequence element is configured to detect a fault if the operating quantity exceeds the restraint quantity as scaled by a slope factor.

25. A method for detecting a fault in a power system comprising a first conductor electrically coupled to a second conductor through a transformer, the method comprising:
receiving a first phase-current measurement obtained from the first conductor;
receiving a second phase-current measurement obtained from the second conductor;
normalizing the first phase-current measurement using a first normalization factor comprising a volt-ampere rating of the transformer, a current ratio of a first current transformer associated with the first phase-current measurement, and a voltage level of the first conductor;
normalizing the second phase-current measurement using a second normalization factor comprising a volt-ampere rating of the transformer, a current ratio of a first current transformer associated with the first phase-current measurement, and a voltage level of the first conductor;
calculating a first negative sequence current using the first normalized phase-current measurement;
calculating a second negative sequence current using the second normalized phase-current measurement;
calculating an operating quantity comprising an absolute value of a sum of the first negative sequence current and the second negative sequence current;
calculating a restraint quantity comprising a maximum value of an absolute value of the first negative sequence current and an absolute value of the second negative sequence current;
scaling the restraint quantity by a slope scale factor; and
detecting a fault in the power system if the operating quantity exceeds the scaled restraint quantity.

* * * * *